(12) United States Patent
Kim et al.

(10) Patent No.: US 8,786,814 B2
(45) Date of Patent: Jul. 22, 2014

(54) LIQUID CRYSTAL DISPLAY APPARATUS

(75) Inventors: Hun-Bae Kim, Yongin (KR); Jong-Seok Chae, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 154 days.

(21) Appl. No.: 13/410,493

(22) Filed: Mar. 2, 2012

(65) Prior Publication Data

US 2013/0077005 A1 Mar. 28, 2013

(30) Foreign Application Priority Data

Sep. 22, 2011 (KR) ........................ 10-2011-0095823

(51) Int. Cl.
*G02F 1/1345* (2006.01)

(52) U.S. Cl.
USPC ............................ 349/150; 349/151; 349/152

(58) Field of Classification Search
USPC ......................................... 349/151
See application file for complete search history.

(56) References Cited

U.S. PATENT DOCUMENTS

| | | | |
|---|---|---|---|
| 2002/0021399 A1* | 2/2002 | Higuchi et al. | ................ 349/149 |
| 2010/0321623 A1* | 12/2010 | Wakita et al. | ................ 349/149 |
| 2011/0057968 A1 | 3/2011 | Kim et al. | |
| 2011/0075390 A1 | 3/2011 | Choi et al. | |

FOREIGN PATENT DOCUMENTS

| | | |
|---|---|---|
| JP | 09-068715 A | 3/1997 |
| KR | 10-2004-0057692 A | 7/2004 |
| KR | 10-2007-0031042 A | 3/2007 |
| KR | 10-2007-0071341 A | 7/2007 |
| KR | 10-2009-0121431 A | 11/2009 |
| KR | 10-2011-0033328 A | 3/2011 |

* cited by examiner

*Primary Examiner* — Wen-Ying P Chen
(74) *Attorney, Agent, or Firm* — Lee & Morse, P.C.

(57) ABSTRACT

A liquid crystal display apparatus includes a liquid crystal panel with a pad portion area, the pad portion area having an input pad portion, the input pad portion including a plurality of input pads and a plurality of dummy pads, an output pad portion, and a conducting wire portion, the conducting wire portion electrically connecting two dummy pads of the plurality of dummy pads in the input pad portion, a driving integrated circuit (IC) on the pad portion area, the driving IC including an input bump portion corresponding to the input pad portion and an output bump portion corresponding to the output pad portion, and a flexible printed circuit (FPC) electrically connected to the driving IC.

15 Claims, 3 Drawing Sheets

LIQUID CRYSTAL DISPLAY APPARATUS

CROSS-REFERENCE TO RELATED PATENT APPLICATION

This application claims the benefit of Korean Patent Application No. 10-2011-0095823, filed on Sep. 22, 2011, in the Korean Intellectual Property Office, the disclosure of which is incorporated herein in its entirety by reference.

BACKGROUND

1. Field

Example embodiments relate to a liquid crystal display apparatus, and more particularly, to a liquid crystal display apparatus that has an improved electrical characteristic and an improved space utilization.

2. Description of the Related Art

Recently, display apparatuses have been replaced with thin flat panel display apparatuses that may be portable. Among the thin flat panel display apparatuses, liquid crystal display apparatuses have attracted much attention because of their low power consumption and low electromagnetic wave generation.

A liquid crystal display apparatus includes a liquid crystal panel that is formed by injecting a liquid crystal layer between two substrates and coupling the two substrates by using a sealing member. The liquid crystal display apparatus also includes a light source, a driving integrated circuit (IC), a flexible printed circuit (FPC), and the like.

Driving ICs supply various electrical signals to a liquid crystal panel for driving the liquid crystal display apparatus. However, there is difficulty in supplying the electrical signals to the liquid crystal panel when the liquid crystal display apparatus becomes larger. Also, there is a problem in utilizing the overall space of the liquid crystal display apparatus when the driving IC and the FPC are improved to smoothly supply the electrical signals. Therefore, there is a limitation in improving an electrical characteristic and a space utilization of the liquid crystal display apparatus.

SUMMARY

Example embodiments provide a liquid crystal display apparatus that has an improved electrical characteristic and an improved space utilization.

According to an aspect of example embodiments, there is provided a liquid crystal display apparatus, including a liquid crystal panel with a pad portion area, the pad portion area having an input pad portion, the input pad portion including a plurality of input pads and a plurality of dummy pads, an output pad portion, and a conducting wire portion, the conducting wire portion electrically connecting two dummy pads of the plurality of dummy pads in the input pad portion, a driving IC on the pad portion area, the driving IC including an input bump portion corresponding to the input pad portion and an output bump portion corresponding to the output pad portion, and a flexible printed circuit (FPC) electrically connected to the driving integrated circuit (IC).

The FPC may include a diode.

The FPC may include at least one test pattern.

The dummy pad and the input pad may be spaced apart from each other.

The input pad may include a first power voltage (VCI) input pad, a gate high voltage (VGH) input pad, and a gate low voltage (VGL) input pad.

The input pad may include a plurality of VCI input pads, a plurality of VGH input pads, and a plurality of VGL input pads.

The plurality of dummy pads may be disposed adjacent at least two outermost input pads from among the plurality of VCI input pads, adjacent at least two outermost input pads from among the plurality of VGH input pads, and adjacent at least two outermost input pads from among the plurality of VGL input pads.

The conducting wire portion may electrically connect the dummy pad adjacent the VCI input pads and the dummy pad adjacent the VGL input pads.

The FPC may include a diode, the diode being electrically connected to one of the dummy pads adjacent the VGL input pads.

The VGL input pads may be commonly connected to circuit patterns of the FPC, and one terminal of the diode being connected to the electrical connection between the VGL input pads and the circuit patterns of the FPC.

At least one of the dummy pads adjacent the VCI input pads may be electrically connected to the dummy pad adjacent the VGL input pads, the VGL input pads being electrically connected to the diode through the conducting wire portion.

The FPC may include a test pattern, at least one of the dummy pads not electrically connected to the diode being connected to the test pattern.

The input pads may include a plurality of VCI input pads between two first dummy pads, a plurality of VGH input pads between two second dummy pads, and a plurality of VGL input pads being between two third dummy pads.

The conducting wire portion may include a first portion electrically connecting one first dummy pad and one second dummy pad, and a second portion electrically connecting another first dummy pad and another second dummy pad, the first and second portions being separated from each other.

The VGL input pads may be commonly connected to a circuit pattern of the FPC, and the FPC may include a diode connected between the circuit pattern and the one second dummy pad.

The FPC may include a diode connected between VGL input pads and VCI input pads, the diode being configured to block current flow from the VGL input pads.

BRIEF DESCRIPTION OF THE DRAWINGS

Features and advantages of the example embodiments will become more apparent by describing in detail exemplary embodiments thereof with reference to the attached drawings, in which.

DETAILED DESCRIPTION

Expressions such as "at least one of," when preceding a list of elements, modify the entire list of elements and do not modify the individual elements of the list.

Now, an exemplary embodiment will be described in detail with reference to the accompanying drawings.

Figure 1:
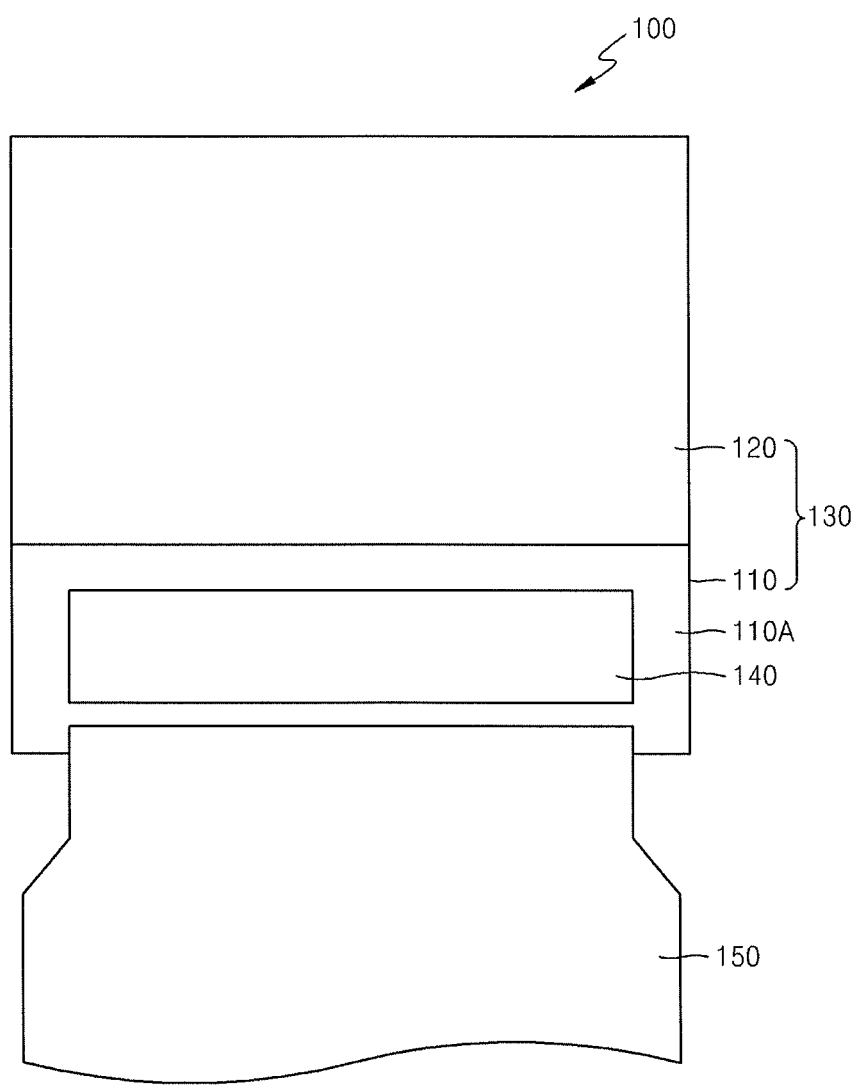
FIG. 1 is a schematic plane view of a liquid crystal display apparatus according to an embodiment.
Figure 2:
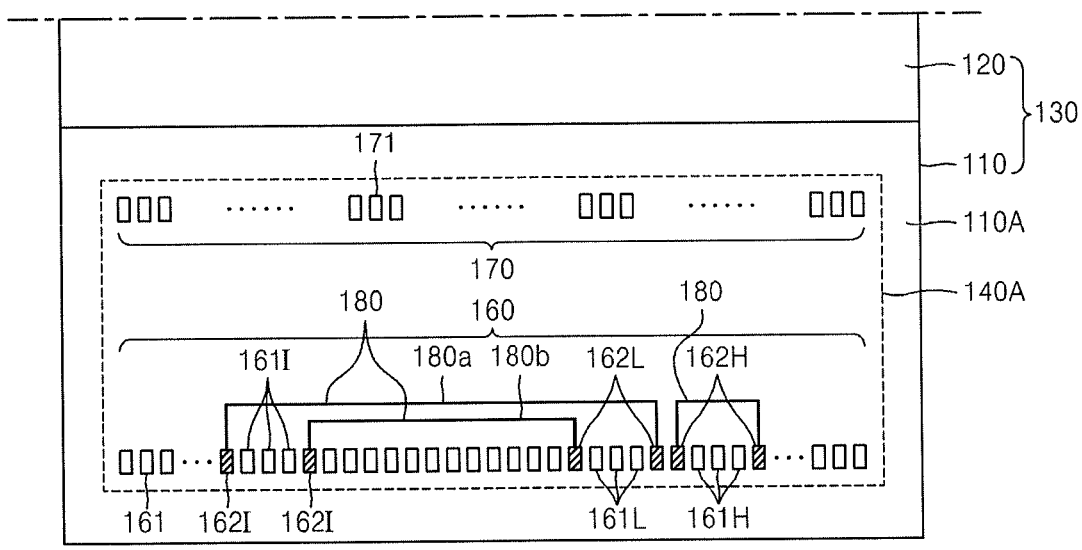
FIG. 2 is an enlarged schematic view of a pad portion area in FIG. 1.
Figure 3:
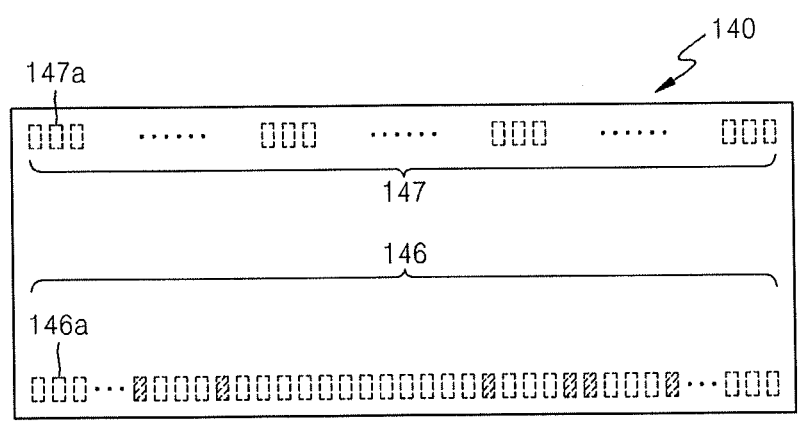
FIG. 3 is an enlarged schematic view of a driving integrated circuit (IC) in FIG. 1.
Figure 4:
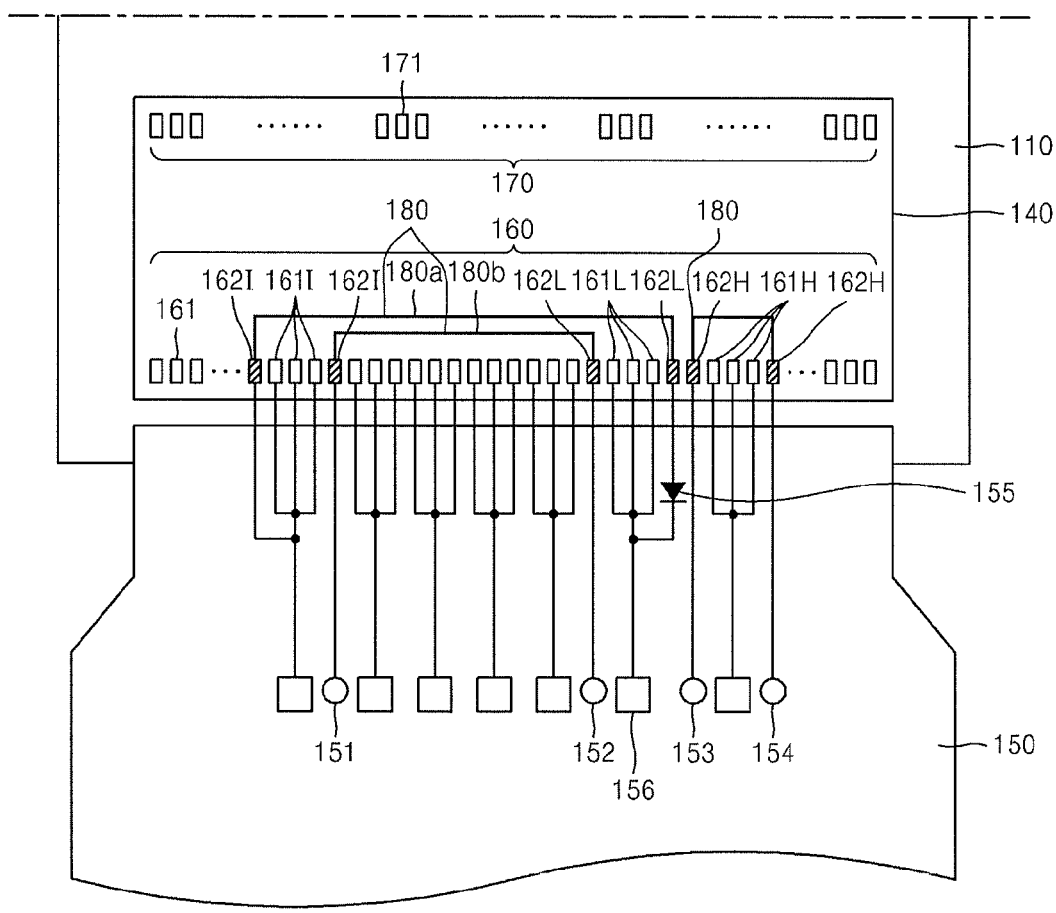
FIG. 4 is a schematic view of the driving IC, pad portion area, and FPC in FIG. 1.

FIG. 1 is a schematic view of a liquid crystal display apparatus 100 according to an embodiment. FIG. 2 is a schematic view of a pad portion area 110A illustrated in FIG. 1. FIG. 3 is a schematic view of a driving integrated circuit (IC) 140 illustrated in FIG. 1. FIG. 4 is a schematic view of the driving IC 140, the pad portion area 110A, and a flexible printed circuit (FPC) 150 in FIG. 1.

Referring to FIG. 1, the liquid crystal display apparatus 100 includes a liquid crystal panel 130, the driving IC 140, and the FPC 150. For convenience of description, FIG. 1 schematically illustrates the pad portion area 110A, the driving IC 140, and the FPC 150, which are to be described below with reference to FIGS. 2 to 4.

The liquid crystal panel 130 includes a lower substrate 110, an upper substrate 120, and liquid crystal (not shown). The liquid crystal is interposed between the lower substrate 110 and the upper substrate 120. The lower substrate 110 and the upper substrate 120 may be formed of glass, e.g., mainly including SiO2, or may be formed of a transparent plastic.

Although not shown in the drawings, a thin film transistor (TFT), a color filter, a black matrix, and the like may be formed in the lower substrate 110 and the upper substrate 120. In detail, for example, signal wiring lines formed of data lines and gate lines are formed in the lower substrate 110, and the TFT is formed at, e.g., each, intersection between a data line and a gate line. Also, a pixel electrode is formed in a pixel area between the data line and the gate line, and a common electrode facing the pixel electrode may be formed in the upper substrate 120 or the lower substrate 110 according to a method of applying an electric field to the liquid crystal.

The pad portion area 110A is formed in any one of the lower substrate 110 and the upper substrate 120 so as to be connected to the data lines and the gate lines. Although the pad portion area 110A is illustrated in the lower substrate 110 in FIG. 1, example embodiments are not limited thereto. That is, the pad portion area 110A may be formed in the upper substrate 120.

The driving IC 140 is mounted on the pad portion area 110A to apply a driving signal to the TFT.

The FPC 150 is connected to the liquid crystal panel 130. An end of the FPC 150 is connected to a PCB (not shown).

Although not shown in the drawings, the liquid crystal display apparatus 100 further includes a light source for supplying light to the liquid crystal panel 130, and a chassis for supporting the liquid crystal panel 130.

The pad portion area 110A of the liquid crystal panel 130 will now be described in detail with reference to FIG. 2. FIG. 2 is a plane view of the pad portion area 110A illustrated in FIG. 1. For convenience of description, the driving IC 140 is not illustrated in FIG. 2, and an area 140A is an area where the driving IC 140 is to be mounted on.

Referring to FIG. 2, an input pad portion 160 and an output pad portion 170 are disposed in the pad portion area 110A. The input pad portion 160 receives various electrical signals from the FPC 150, and the output pad portion 170 transmits the electrical signals to the liquid crystal panel 130. The input pad portion 160 and the output pad portion 170 include a plurality of pads 161 and a plurality of pads 171, respectively.

The input pad portion 160 includes the input pads 161. The input pads 161 receive various electrical signals from the FPC 150. In detail, the input pads 161 of the input pad portion 160 includes at least one first power voltage (VCI) input pad 161I, at least one gate low voltage (VGL) input pad 161L, and at least one gate high voltage (VGH) input pad 161H. For example, as illustrated in FIG. 2, three VCI input pads 161I are arranged in parallel, three VGL input pads 161L are arranged in parallel, and three VGH input pads 161H are arranged in parallel. However, example embodiments are not limited thereto, and two or more VCI input pads 161I may be arranged in parallel, two or more VGL input pads 161L may be arranged in parallel, and two or more VGH input pads 161H may be arranged in parallel.

Also, two dummy pads 162I are formed adjacent to both outermost pads 161I from among the VCI input pads 161I, two dummy pads 162L are formed adjacent to both outermost pads 161L from among the VGL input pads 161L, and two dummy pads 162H are formed adjacent to both the outermost pads 161H of the VGH input pads 161H. In other words, the VCI input pads 161I are arranged between two dummy pads 162I, the VGL input pads 161L are arranged between two dummy pads 162L, and the VGH input pads 161H are arranged between two dummy pads 162H. For example, as illustrated in FIG. 2, all the input pads 161 with the dummy pads 162I, 162L, and 162H may aligned to be arranged in a single row, so each type of input pads is between corresponding dummy pads.

A plurality of conducting wire portions 180 are formed on the input pad portion 160. The conducting wire portions 180 are formed spaced apart from the output pad portion 170.

The conducting wire portion 180 electrically connects dummy pads. That is, the conducting wire portion 180 may include a first conducting portion 180a connecting the left dummy pad 162I from among the two dummy pads 162I adjacent the VCI input pads 161I and the right dummy pad 162L from among the two dummy pads 162L adjacent the VGL input pads 161L. The conducting wire portion 180 may also include a second conducting portion 180b electrically connecting the right dummy pad 162I from among the two dummy pads 162I adjacent the VCI input pads 161I and the left dummy pad 162L from among the two dummy pads 162L adjacent the VGL input pads 161L. The conducting wire portion 180 may also include a third conducting portion 180c electrically connecting the left dummy pad 162H and the right dummy pad 162H from among the two dummy pads 162H adjacent the VGH input pads 161H.

The driving IC 140 mounted on the pad portion area 110A of the liquid crystal panel 130 will now be described in detail with reference to FIG. 3. For convenience of description, FIG. 3 illustrates a bottom surface of the driving IC 140. That is, portions shown as a dashed line are portions formed on the bottom surface of the driving IC 140, i.e., a surface facing the pad portion area 110A.

Referring to FIG. 3, the driving IC 140 includes an input bump portion 146 and an output bump portion 147, wherein the input bump portion 146 includes a plurality of input bumps 146a and the output bump portion 147 includes a plurality of output bumps 147a.

In detail, the input bump portion 146 of the driving IC 140 is formed to correspond to the input pad portion 160 of the pad portion area 110A. That is, if the driving IC 140 is mounted on the liquid crystal panel 130, the input bump portion 146 is electrically connected to the input pad portion 160.

Also, the output bump portion 147 of the driving IC 140 is formed to correspond to the output pad portion 170 of the pad portion area 110A. That is, if the driving IC 140 is mounted on the liquid crystal panel 130, the output bump portion 147 is electrically connected to the output pad portion 170.

The driving IC 140, the pad portion area 110A, and the FPC 150 will now be described in detail with reference to FIG. 4. For convenience of description, FIG. 4 illustrates the pad portion area 110A that is invisible when the driving IC 140 is mounted on the liquid crystal panel 130. That is, the input pad portion 160, the output pad portion 170, and the conducting wire portion 180 of the pad portion area 110A illustrated in FIG. 4 are actually covered by the driving IC 140.

Also, for convenience of description, the input bump portion 146 and the output bump portion 147 of the driving IC 140 are not illustrated in FIG. 4. As described above, the input bump portion 146 and the output bump portion 147 of the driving IC 140 are formed to have patterns corresponding to the input pad portion 160 and the output pad portion 170, and thus the input pad portion 160 and the output pad portion 170 illustrated in FIG. 4 may be regarded as the input bump portion 146 and the output bump portion 147 of the driving IC 140, for convenience of understanding.

Referring to FIG. 4, a plurality of circuit patterns 156, a diode 155, and a plurality of test patterns, e.g., first, second, third, and fourth test patterns 151, 152, 153, and 154, are formed in the FPC 150.

The circuit patterns 156 may be any of various electrical patterns, e.g., a power supply pattern, a ground pattern, a capacity pattern, or the like. The circuit pattern 156 is electrically connected to the input pad portion 160 of the pad portion area 110A.

The diode 155 is electrically connected to the right dummy pad 162L from among the two dummy pads 162L formed adjacent to the VGL input pads 161L, i.e., the diode 155 is electrically connected to the dummy pad 162L adjacent the dummy pad 162H. Also, the VGL input pads 161L are commonly and electrically connected to the circuit pattern 156. One terminal of the diode 155 is electrically connected to the electrical connection between the VGL input pads 161L and the circuit pattern 156. That is, the one terminal of the diode 155 is electrically connected to the VGL input pads 161L and the circuit pattern 156.

The VCI input pads 161I are commonly connected to the circuit pattern 156. The left dummy pad 162I from among the two dummy pads 162I formed adjacent to the VCI input pads 161I is electrically connected to the electrical connection between the VCI input pads 161I and the circuit pattern 156. That is, the left dummy pad 162I is electrically connected to the VCI input pads 161I and the circuit pattern 156.

As the diode 155 is connected between the left dummy pad 162I, i.e., via the right dummy pad 162L, and the VGL input pads 161L, the diode 155 is, consequently, disposed between the VCI input pads 161I and the VGL input pads 161L. Thus, reverse current flowing from the VGL input pads 161L to the VCI input pads 161I may be prevented, thereby preventing a latch up phenomenon resulting due to the reverse current.

Also, the right dummy pad 162I of the two dummy pads 162I formed adjacent to the VCI input pads 161I is electrically connected to the first test pattern 151 and spaced apart from the electrical connection between the VCI input pads 161I and the circuit pattern 156. That is, the right dummy pad 162I is spaced apart from the VCI input pads 161I and the circuit pattern 156 and is connected to the first test pattern 151.

The left dummy pad 162L from among the two dummy pads 162L formed adjacent to the VGL input pads 161L is electrically connected to the second test pattern 152 and spaced apart from the electrical connection between the VGL input pads 161L and the circuit pattern 156. That is, the left dummy pad 162L is spaced apart from the VGL input pads 161L and the circuit pattern 156 and is connected to the second test pattern 152.

Also, the left dummy pad 162H and the right dummy pad 162H from among the two dummy pads 162H formed adjacent to the VGH input pads 161H are electrically connected to the third test pattern 153 and the fourth test pattern 154, respectively. Also, the left and right dummy pads 162H are spaced apart from the electrical connection between the VGH input pads 161H and the circuit pattern 156. That is, the left and right dummy pads 162H are spaced apart from the VGH input pads 161H and the circuit pattern 156.

In the liquid crystal display apparatus 100 according to the example embodiments, reverse current flowing from the VGL input pads 161L to the VCI input pads 161I through the diode 155 may be prevented, thereby preventing a latch up phenomenon resulting due to the reverse current from occurring. Thus, an electrical characteristic of the liquid crystal display apparatus 100 is increased.

In particular, the diode 155 may be connected between the VCI input pads 161I and the VGL input pads 161L through the conducting wire portions 180 and the dummy pads 162I and 162L formed in the pad portion area 110A of the liquid crystal panel 130. Therefore, there is no need to form a separate conducting wire pattern for connecting the diode 155 on the FPC 150, thereby simplifying the structure and formation of the FPC 150.

In contrast, when a conventional diode is disposed between VGL input pads and VCI input pads, i.e., without using conducting wire portions and dummy pads, a layer must be separately formed in order to electrically connect the VGL input pads, the VCI input pads, and the diode, without contacting the circuit patterns. Further, such separate layer should be electrically insulated from a layer in which the circuit patterns are formed.

However, in the example embodiments, since the conducting wire portions 180 and the dummy pads 162I and 162L are formed, there is no need to form a separate layer besides the layer in which the circuit patterns 156 are formed, thereby simplifying the manufacturing process of the FPC 150, improving space utilization of the FPC 150, and preventing electrical defects from being generated in the FPC 150.

Also, the dummy pads 162I, 162L, and 162H that are not connected to the diode 155, i.e., the right dummy pad 162I from among the two dummy pads 162I formed adjacent to the VCI input pads 161I, the left dummy pad 162L from among the two dummy pads 162L formed adjacent to the VGL input pads 161L, and the left dummy pad 162H and the right dummy pad 162H from among the two dummy pads 162H formed adjacent to the VGH input pads 161H, are connected to the conducting wire portion 180 and the fourth test pattern 154, thereby easily testing the driving of the liquid crystal display apparatus 100. In particular, since there is no need to form a separate space for forming the fourth test pattern 154, space utilization of the liquid crystal display apparatus 100 may be improved.

A liquid crystal display apparatus according to the example embodiments has an improved electrical characteristic and an improved space utilization.

While the example embodiments has been particularly shown and described with reference to exemplary embodiments thereof, it will be understood by those of ordinary skill in the art that various changes in form and details may be made therein without departing from the spirit and scope of the example embodiments as defined by the following claims.

What is claimed is:

1. A liquid crystal display apparatus, comprising:
  a liquid crystal panel with a pad portion area, the pad portion area including:
    an input pad portion, the input pad portion including a plurality of input pads and a plurality of dummy pads,
    an output pad portion, and
    a conducting wire portion, the conducting wire portion electrically connecting two dummy pads of the plurality of dummy pads in the input pad portion;
  a driving integrated circuit (IC) on the pad portion area, the driving IC including an input bump portion corresponding to the input pad portion and an output bump portion corresponding to the output pad portion; and
a flexible printed circuit (FPC) electrically connected to the driving IC, the FPC including a diode.

2. The liquid crystal display apparatus of claim 1, wherein the FPC further comprises at least one test pattern.

3. The liquid crystal display apparatus of claim 1, wherein the dummy pad and the input pad are spaced apart from each other.

4. A liquid crystal display apparatus, comprising:
a liquid crystal panel with a pad portion area, the pad portion area including:
an input pad portion, the input pad portion including a plurality of input pads and a plurality of dummy pads,
an output pad portion, and
a conducting wire portion, the conducting wire portion electrically connecting two dummy pads of the plurality of dummy pads in the input pad portion;
a driving integrated circuit (IC) on the pad portion area, the driving IC including an input bump portion corresponding to the input pad portion and an output bump portion corresponding to the output pad portion; and
a flexible printed circuit (FPC) electrically connected to the driving IC,
wherein the input pad includes a first power voltage (VCI) input pad, a gate high voltage (VGH) input pad, and a gate low voltage (VGL) input pad.

5. The liquid crystal display apparatus of claim 4, wherein the input pad includes a plurality of VCI input pads, a plurality of VGH input pads, and a plurality of VGL input pads.

6. The liquid crystal display apparatus of claim 5, wherein the plurality of dummy pads are disposed adjacent at least two outermost input pads from among the plurality of VCI input pads, adjacent at least two outermost input pads from among the plurality of VGH input pads, and adjacent at least two outermost input pads from among the plurality of VGL input pads.

7. The liquid crystal display apparatus of claim 6, wherein the conducting wire portion electrically connects the dummy pad adjacent the VCI input pads and the dummy pad adjacent the VGL input pads.

8. The liquid crystal display apparatus of claim 7, wherein the FPC includes a diode, the diode being electrically connected to one of the dummy pads adjacent the VGL input pads.

9. The liquid crystal display apparatus of claim 8, wherein the VGL input pads are commonly connected to circuit patterns of the FPC, and one terminal of the diode being connected to the electrical connection between the VGL input pads and the circuit patterns of the FPC.

10. The liquid crystal display apparatus of claim 8, wherein at least one of the dummy pads adjacent the VCI input pads is electrically connected to the dummy pad adjacent the VGL input pads, the VGL input pads being electrically connected to the diode through the conducting wire portion.

11. The liquid crystal display apparatus of claim 8, wherein the FPC includes a test pattern, at least one of the dummy pads not electrically connected to the diode being connected to the test pattern.

12. A liquid crystal display apparatus, comprising:
a liquid crystal panel with a pad portion area, the pad portion area including:
an input pad portion, the input pad portion including a plurality of input pads and a plurality of dummy pads,
an output pad portion, and
a conducting wire portion, the conducting wire portion electrically connecting two dummy pads of the plurality of dummy pads in the input pad portion;
a driving integrated circuit (IC) on the pad portion area, the driving IC including an input bump portion corresponding to the input pad portion and an output bump portion corresponding to the output pad portion; and
a flexible printed circuit (FPC) electrically connected to the driving IC,
wherein the input pads include:
a plurality of VCI input pads between two first dummy pads,
a plurality of VGH input pads between two second dummy pads, and
a plurality of VGL input pads being between two third dummy pads.

13. The liquid crystal display apparatus of claim 12, wherein the conducting wire portion a first portion electrically connects one first dummy pad and one second dummy pad, and a second portion electrically connecting another first dummy pad and another second dummy pad, the first and second portions being separated from each other.

14. The liquid crystal display apparatus of claim 13, wherein:
the VGL input pads are commonly connected to a circuit pattern of the FPC, and
the FPC includes a diode connected between the circuit pattern and the one second dummy pad.

15. The liquid crystal display apparatus of claim 12, wherein the FPC includes a diode connected between VGL input pads and VCI input pads, the diode being configured to block current flow from the VGL input pads.

* * * * *